Aug. 18, 1964   D. J. McCULLOCH   3,145,254
OPHTHALMIC MOUNTING
Filed April 2, 1962

INVENTOR.
DONALD J. McCULLOCH
BY Frank C. Parker
ATTORNEY 3,145,254
OPHTHALMIC MOUNTING
Donald J. McCulloch, Greece, N.Y., assignor to Bausch & Lomb Incorporated, Rochester, N.Y., a corporation of New York
Filed Apr. 2, 1962, Ser. No. 184,467
3 Claims. (Cl. 88—53)

The present invention relates to ophthalmic mountings and, more particularly, to a spring hinge connection between a spectacle front and a spectacle temple.

The principal object of the present invention is to provide an ophthalmic mounting having an improved hinge construction of the general type including spring means for exerting a biasing force on the temples to urge them inwardly in order to better retain the spectacles in the proper position on the wearer.

Other objects as well as numerous advantages of the present invention will become more apparent from the following detailed description thereof when read in conjunction with the accompanying drawing, wherein.

Figure 1:
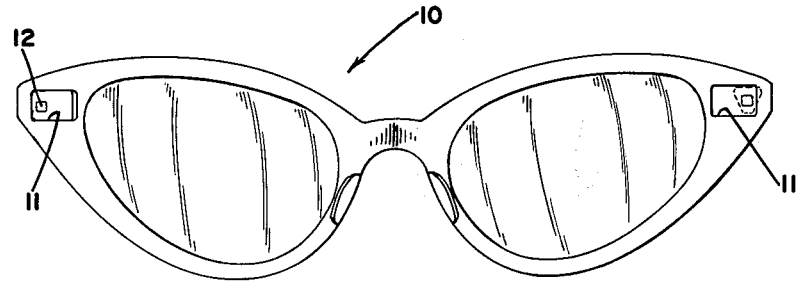
FIG. 1 is a back elevational view of a spectacle front constructed in accordance with the present invention.

With reference now to the drawing, wherein like reference numerals have been used in the different views to identify identical parts, an ophthalmic mounting represented generally by reference numeral 10 is disclosed and is formed with a notch 11 in the temple portion on each side of the ophthalmic mounting 10. An aperture 12 extends through the temple front within the boundaries of the notch 11 and is adapted to receive a hinge mounting post 13 therein.

The hinge mounting post 13 is formed with a suitable head 14 adapted to abut the front surface 15 of the ophthalmic frame 10 and is also formed with a hook portion 16 which opens outwardly with respect to the ophthalmic frame 10. A U-shaped leaf spring 17 is of the proper size so as to be relatively snugly received within notch 11. The U-shaped leaf spring 17 is formed with a pair of openings 18 through which the post 13 protrudes.

The spectacle also includes a pair of temples, only one of which is shown and which is represented by reference numeral 19. Temple 19 is formed with an elongate metal insert 20 which is suitably retained in the end of the temple 19 and which is formed with a curved portion 21 having an aperture 22, and a cross portion 23. Beyond the cross portion 23 the insert 20 is bifurcated to form two feet 24.

Figure 3:
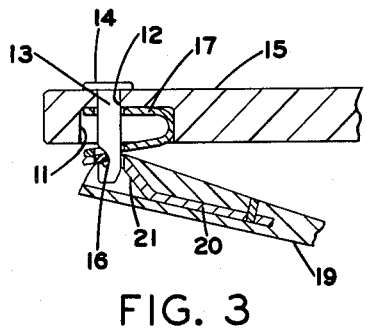
FIG. 3 is a fragmentary sectional view showing the present hinge construction with the temple in closed position.
Figure 4:
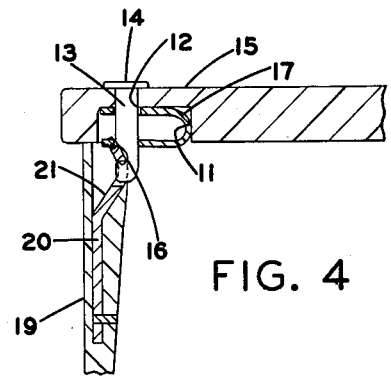
FIG. 4 is a fragmentary sectional view of a hinge connection showing the temple opened against the urging of the biasing spring.
Figure 2:
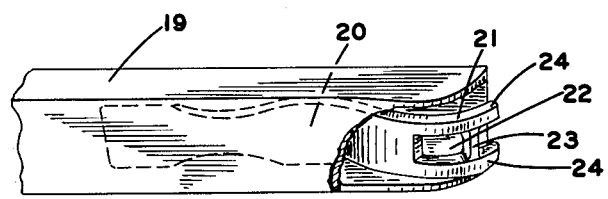
FIG. 2 is an exploded perspective view of the hinge connection between a spectacle temple and front in accordance with the present invention.
Figure 2:
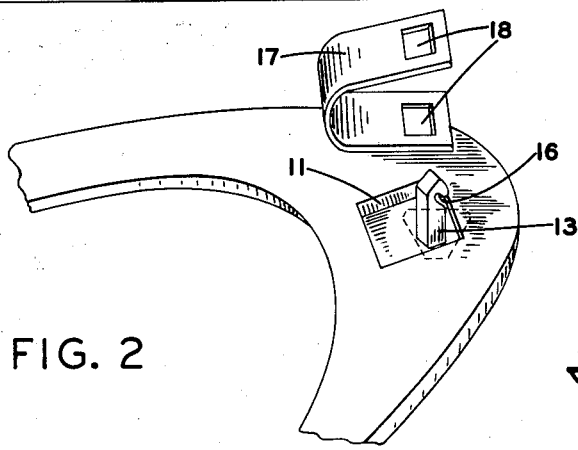
Figure 5:
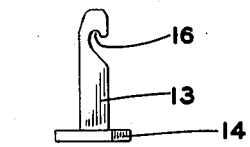
FIG. 5 is a detailed view of the mounting bolt for interconnecting the spectacle temple and front.

When the temple 19 is assembled with the front 10, the post 13 extends through aperture 22 and across piece 23 engages beneath the hook portion 16. The bifurcated feet 24 engage the outward end of leaf spring 17 and comprise an eccentric with respect to the pivotal connection between cross piece 23 and hook 16. Thus, when the temple 19 is moved from the position shown in FIG. 3 to the position shown in FIG. 4, the spring 17 biases the temple 19 toward a closed position (i.e., the position shown in FIG. 3).

It will thus be seen that the coaction between the eccentric bifurcated portion 24 of temple insert 20 and the leaf spring 17 is effective to urge the temples 19 toward a closed position thereby retaining in a more firm manner the spectacles in the proper position on the wearer thereof.

It is contemplated that changes and modifications may be made in the present invention without departing from the spirit or scope thereof.

What is claimed is:
1. Spectacle hinge structure for hingedly interconnecting a spectacle front and a spectacle temple and comprising a post retained by and projecting from the front surface through the rear surface of the temple portion of said front and having an outwardly opening hook portion at the end which projects through the rear surface of the temple portion, a U-shaped leaf spring member having apertures adjacent each end thereof, said post extending through said apertures, a hinge member secured to the end of said temple and having a cross portion seated beneath said post hook portion to form a pivotal connection between said temple and said front, and said temple hinge member including an eccentric portion projecting beyond said cross portion and disposed in sliding engagement with said leaf spring member whereby said leaf spring member exerts a biasing force on said temple urging the latter toward a closed position with respect to the spectacle front.

2. Spectacle hinge structure for hingedly interconnecting a spectacle front and a spectacle temple and comprising a post retained by and projecting from the front surface through the rear surface of the temple portion of said front and having an outwardly opening hook portion at the end which projects through the rear surface of the temple portion, a U-shaped leaf spring member having apertures adjacent each end thereof with said post extending through said apertures, a slot in the rear surface of said temple portion and having said spring member received therein, a hinge member secured to the end of said temple and having a cross portion seated beneath said post hook portion to form a pivotal connection between said temple and said front, and said temple hinge member including an eccentric portion projecting beyond said cross portion and disposed in sliding engagement with said leaf spring member whereby said leaf spring member exerts a biasing force on said temple urging the latter toward a closed position with respect to the spectacle front.

3. Spectacle hinge structure for hingedly interconnecting a spectacle front and a spectacle temple and comprising a post retained by and projecting from the front surface through the rear surface of the temple portion of said front and having an outwardly opening hook portion at the end which projects through the rear surface of the temple portion, a U-shaped leaf spring member having apertures adjacent each end thereof with said post extending through said apertures, a slot in the rear surface of said temple portion and having said spring member received therein, a hinge member secured to the end of said temple and having a cross portion seated beneath said post hook portion to form a pivotal connection between said temple and said front, and said temple hinge member including a bifurcated eccentric portion projecting beyond said cross portion and disposed in sliding engagement with said leaf spring member whereby said leaf spring member exerts a biasing force on said temple urging the latter toward a closed position with respect to the spectacle front.

References Cited in the file of this patent

UNITED STATES PATENTS 644,203    Hoffman    Feb. 27, 1900

FOREIGN PATENTS 859,931    Great Britain    Jan. 25, 1961
352,164    Switzerland    Mar. 30, 1961